Figure 1:
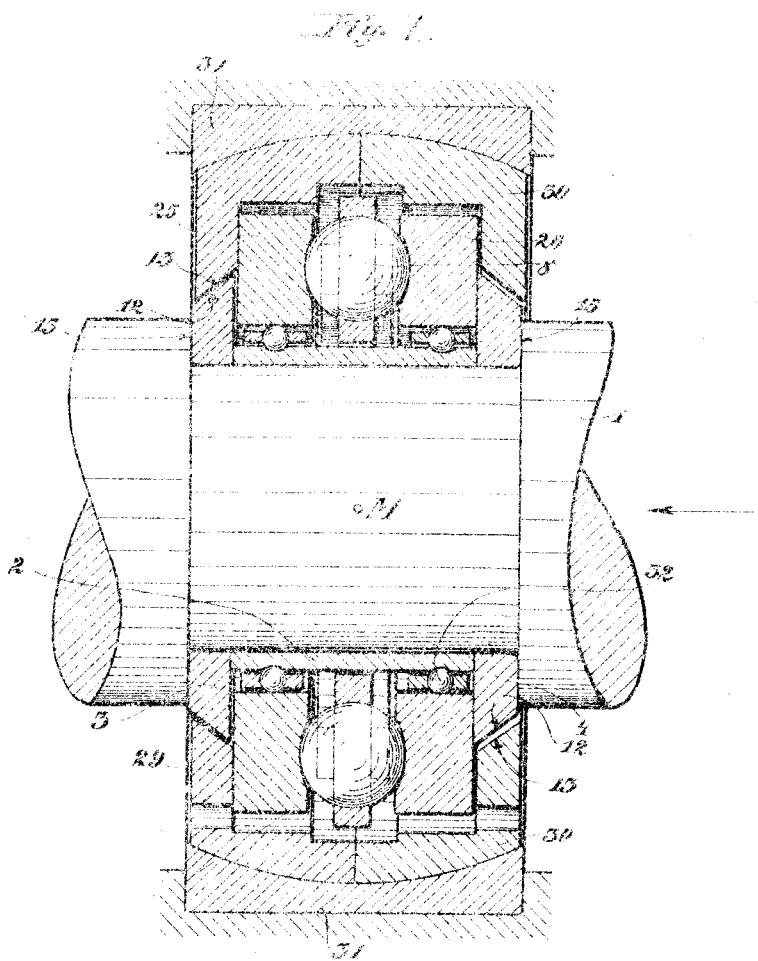

P. BRÜHL & O. SEHMISCH.
DOUBLE ACTING ANTIFRICTIONAL THRUST BEARING.
APPLICATION FILED JULY 10, 1912.

1,087,482.

Patented Feb. 17, 1914.
2 SHEETS—SHEET 1.

Witnesses:
Inventors:
Paul Brühl
Otto Sehmisch,

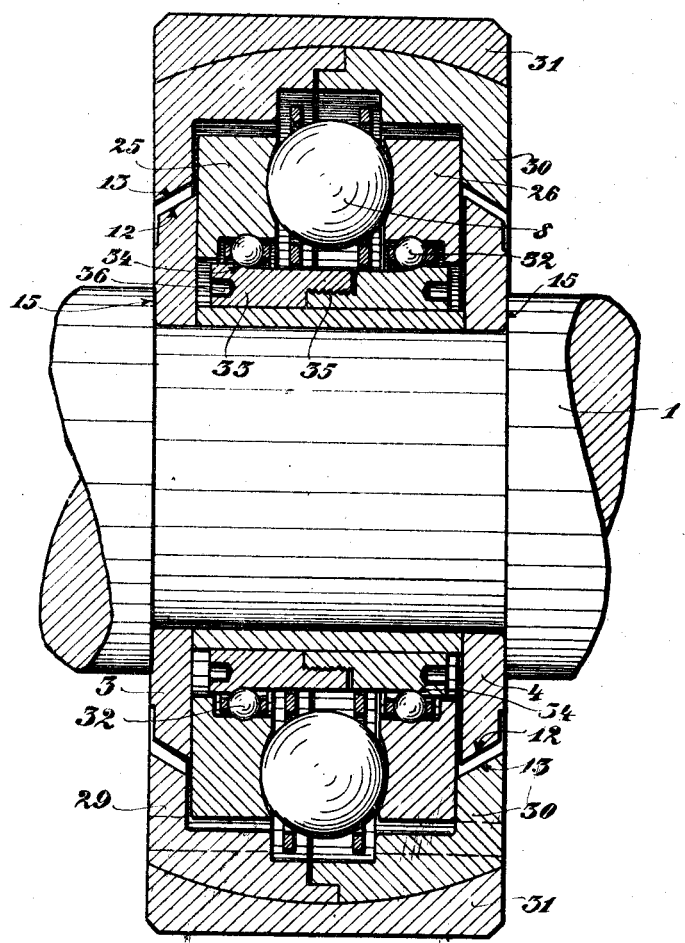

UNITED STATES PATENT OFFICE.

PAUL BRÜHL AND OTTO SEHMISCH, OF DÜSSELDORF, GERMANY.

DOUBLE-ACTING ANTIFRICTIONAL THRUST-BEARING.

1,087,482.   Specification of Letters Patent.   Patented Feb. 17, 1914.

Application filed July 10, 1912. Serial No. 708,697.

*To all whom it may concern:*

Be it known that we, PAUL BRÜHL and OTTO SEHMISCH, subjects of the German Emperor, residing at Düsseldorf, Germany, have invented certain new and useful Improvements in Double-Acting Antifrictional Thrust-Bearings, of which the following is a specification.

Our invention relates to a number of improvements in so called ball thrust-bearings, that is to say in ball bearings in which a certain amount of play of the parts forming the ball-races, both in relation to the bearing, as well as to the shaft is admissible, so that the bearing may respond to axial pressure from either side.

The improvements aim at further perfection and simplification of such ball bearings, which will permit them to be readily taken down, so that the parts forming the ball race as such, while easily accessible are nevertheless effectively secured in their correct position.

Our invention, besides, offers the advantage that the ball bearing, notwithstanding its many component parts may be fitted together so as to form one complete whole, and as such be ready for sale as well as for being fitted in its place and may as easily be again taken down into its several parts.

In the accompanying drawing: Figure 1 is a vertical axial section through a preferred form of our ball-bearing. Fig. 2 is a similar section through a modification of said bearing.

As shown in the drawing, the circumferential surfaces of the rings forming the ball-races, in accordance with usual practice, are cylindrical, whereas spherical shape is given to the outside of the bushes. This enables the displacement of the whole bearing in radial direction, while on the other hand it may follow any pendulum motion of the shaft, no matter where the pivot of such motion is situated. The rings forming the ball races in relation to the shaft are furthermore separately supported, so that, upon change of pressure, the same are altogether prevented from settling. By this means the inner ring forming the ball race, which remains idle for an instant when pressure changes, is prevented from jamming and the consequent danger of wear in the bearing removed.

According to the construction shown in the drawing (Fig. 1), shaft 1 is provided with a journal, having shoulders 15 on both sides, which serve to hold the bearing to the shaft. The ball train 8 destined to take up the thrust is arranged between the rings 25 and 26 forming the ball-races, the exterior face ends of which are plane, while they are surrounded by bushes 29 and 30 of suitable cross-section. The inner faces of the said bushes are so located and arranged that the play allowed to the rings 25, 26 forming the ball races within the bushes 29, 30 is of a constant predetermined amount. The outside circumference of the bushes is spherical and they are held together by an annular casing 31.

Pressure from the shaft is transmitted to the bearing by means of thrust collars 3 and 4, which are beveled on their circumference and retained in their position by the conical overlapping bores 13 of the bushes 29 and 30. Similarly a sleeve 2, the interior diameter of which corresponds to the diameter of the journal of the shaft, is placed between the thrust collars. The rings forming the ball-races in relation to the shaft are supported by suitable means, which according to the construction shown in the drawing consist in two suitably arranged ball-trains 32.

In practice the shaft may either displace itself parallel to its axis, which, for example, occurs, when the shaft is lowered bodily and uniformly, or the shaft may swing around some point of its axis. This latter case occurs when, for example, one of two bearings of a shaft wears out more than the other. In case the shaft displaces itself parallel to its axis the parts, directly seated on the shaft, together with such other members which are held by them, will take part in the parallel displacement. Upon the shaft lowering itself, also the sleeve 2, the thrust collars 3 and 4, the rings 25, 26 forming the ball-races as well as the ball trains 8 and 32 will lower themselves concurrently. In the main therefore, a displacement of the inner rings in relation to the outer rings only occurs, which has become possible because this invention provides for plane contact surfaces between the two pairs of rings. In case the shaft swings around some point of its axis, as for instance around the mathematical center of the bearing, that is to say the center M of the spherical inside of the annular casing 31. In such a case, all and every part of the bearing will follow the movements of the shaft. This case will, however, in practice occur but very seldom. On the contrary the shaft will practically always pivot on some other part of its mathematical axis and the combination of the two possible displacements of the bearing will enable it to adjust itself automatically. In such a case all the several members of the bearings with exception of the annular casing 31, will conjointly pivot on the mathematical center M of the bearing, while simultaneously a sliding displacement of the rings 25, 26 forming the ball races, together with the other bearing members 8, 3, 4, 2 and 32 connected thereto, in relation to the bushes 29 and 30 takes place. This possibility of the bearing displacing itself in a double sense, provides for every required adjustment within practical limits. As a consequence, jamming and sliding friction as well as destruction of inner members of the bearing resulting therefrom, are effectively prevented. The ball trains 32 prevent the rings 25, 26 forming the ball races from sinking while change of pressure takes place, whereby the grooves of the said rings forming the ball races in relation to the ball train 8 remain permanently centered, so that the bearing is not required to adjust itself after every change of pressure. In place of the ball trains 28, obviously any other suitable supporting means, such as for instance roller trains or intermediate collars, preferably made of anti-friction metal may be employed. As another alternative the rings 25, 26 forming the ball races might be mounted directly on the sleeve 2, or even, if the latter be eliminated, directly on the journal of the shaft.

In constructing ball thrust bearings in accordance with Fig. 1 of larger size, care has to be taken that the ring forming the ball races are prevented from separating in the direction of their axis. This separation of the ring forming the races is liable to be brought about by the centrifugence of the balls by the action of which the said balls tend to separate the rings forming the raceways. But even while at rest the balls will by their weight have a tendency of separating the rings forming the races. In addition such a separation is liable to happen during work when there is an alternation of the pressure exerted upon the bearing by the axle or shaft, because during such alternation the bearing becomes for a short moment uncharged and thus also the balls are for a short time in a position of rest and, accordingly, act on the rings forming the races by their weight.

The above mentioned purpose will be attained by making the ball bearing in accordance with the modified construction shown in section in Fig. 2 and in which for the small balls 32 carrying the rings 25, 26 forming the raceways 25, 26 are provided race faces 34 on the external circumference of the sleeve 33, the said faces ascending toward the ends of the sleeve. The said sleeve is in the direction of its axle divided into two parts which are held together, preferably by hidden screw threads 25. This screwing of the portions of the sleeve may be easily loosened or unscrewed and again screwed on by means of proper keys inserted into borings 36. The faces 34 prevent an outward dislocation in axial direction of the trains of the small balls 32 and, accordingly, a thrusting aside by the heavier balls 8 in any way as above indicated, of the rings 25, 26 forming the races carried and supported by the said small balls 32 and, thus, a rubbing of their external flat faces. This arrangement is particularly adapted for ball bearings of heavier construction, in accordance with the modification hereinabove described and illustrated by Fig. 1 and, in addition, in all cases where the parts forming the ball ways proper, in the present case the rings 25, 26 forming the race ways, are supported by separate balls not participating in the pressure exerted by the ball bearing.

Having now particularly described and ascertained the nature of our said invention and in what manner the same is to be performed, we declare that what we claim is:—

In a ball bearing the combination of a shaft, a sleeve immovably fixed to said shaft, projecting rings fixed immovably on the ends of said sleeve, provided with conical faces, two inner rings located between said projecting rings, two rows of running balls between said inner rings and said sleeve, a bipartite outer casing surrounding said inner rings provided with conical inner faces spaced apart from the conical faces of said projecting rings for allowing a play between said rings in axial as well as radial direction, the inner rings being ball faced on their adjacent surfaces, a row of balls between said ball faced surfaces of said inner rings, and a closed annular outer casing snugly fitting with its inner concave face against the outer convex face of said bi-partite casing, the whole constituting a compact ball-bearing.

In testimony whereof we affix our signatures in presence of two witnesses.

PAUL BRÜHL. [L. S.]
OTTO SEHMISCH. [L. S.]

Witnesses:
HELEN NUFER,
ALBERT NUFER.